United States Patent [19]

Hara et al.

[11] Patent Number: 4,626,682
[45] Date of Patent: Dec. 2, 1986

[54] ANGLE MEASURING DEVICE

[75] Inventors: Masato Hara; Masaaki Niiho; Eiji Takasugi; Ryouji Honda, all of Tokyo, Japan

[73] Assignee: Asahi Kogaku Kogyo Kabushiki Kaisha, Tokyo, Japan

[21] Appl. No.: 620,582

[22] Filed: Jun. 14, 1984

[30] Foreign Application Priority Data

Jun. 29, 1983 [JP] Japan ............................. 58-99487[U]

[51] Int. Cl.$^4$ ............................................. G01D 5/34
[52] U.S. Cl. ............................. 250/231 SE; 33/1 PT
[58] Field of Search ................... 250/231 SE, 237 G; 324/175; 340/347 P; 356/395, 138, 151; 33/1 N, 1 PT

[56] References Cited

U.S. PATENT DOCUMENTS 4,318,225 3/1982 Jenkinson ................ 250/231 SE X

Primary Examiner—Eugene R. LaRoche
Assistant Examiner—Steven J. Mottola
Attorney, Agent, or Firm—Sughrue, Mion, Zinn, Macpeak & Seas

[57] ABSTRACT

An improved angle measuring device in which rotational irregularity in the form of two cycles or more per rotational cycle of the motor driving device is compensated for completely. A period of time $T_1$ required for a cutout formed in the periphery of a rotor rotating at a constant speed to make one revolution starting from a stationary reference point, and a period of time $T_2$ required for the cutout to move between the reference point and an angle measuring point are obtained to evaluate $360° \times (T_2/T_1)$ to obtain the angle under measurement. The cutout has an angular width of approximately 90°, although angular widths in a range of 5° to 355° can be used as the situation demands.

6 Claims, 6 Drawing Figures

ANGLE MEASURING DEVICE

BACKGROUND OF THE INVENTION

The present invention relates to an improved angle measuring device such as a transit (theodolite).

A device for measuring angles without using scales is disclosed, for instance, in U.S. Army Engineer Topographic Laboratories Report ETL-TR-72-1. In this conventional angle measuring device, a period of time $T_1$ for a slit provided in the periphery of a rotor rotating at a constant speed to make one complete revolution starting from a stationary reference point and a period of time $T_2$ required for the slit to move from the reference point to an angle measuring point are obtained, and the angle to be measured is obtained by evaluating the following expression:

$$360° \times (T_2/T_1).$$

This angle measuring device is advantageous in that, as no scale is needed, the way in which the measurement is made is simple, and the construction of the device is also simple.

The above report also refers to a so-called "180° opposed reading method" used to compensate for the error which is caused when the center of rotation of the rotor is not coaxial with the center of rotation of the angle measuring point. In the method disclosed by the report, the speed of the rotor greatly affects the angle measurement accuracy. Accordingly, in order to maintain a high measurement accuracy, the motor driving the rotor must be capable of providing a highly constant speed.

If one cycle of rotational irregularity occurs within each revolution of the rotor, its adverse effects may be cancelled by employing the 180° opposed reading method. On the other hand, it has been found through experiments on the system disclosed by the report that, in a motor or in a feedback detecting system for rotation control, usually two cycles of rotational irregularity occur for each revolution. This error cannot be cancelled with the 180° opposed reading method.

SUMMARY OF THE INVENTION

In view of the foregoing, an object of the invention is to provide an angle measuring device in which two cycles of rotational irregularity per rotational cycle of the motor are sufficiently compensated and temperature compensation is applied to the detecting sections.

The foregoing and other objects of the invention have been achieved by the provision of an angle measuring device in which a part to be detected on the rotor is a cutout having an angular width not less than 5° but less than 360°, and data indicative of the rise and fall of a pulse produced in association with the rotation of the cutout is utilized for measuring angles.

DESCRIPTION OF THE PREFERRED EMBODIMENTS

The present invention will be described with reference to preferred embodiments shown in the accompanying drawings.

Figure 1:
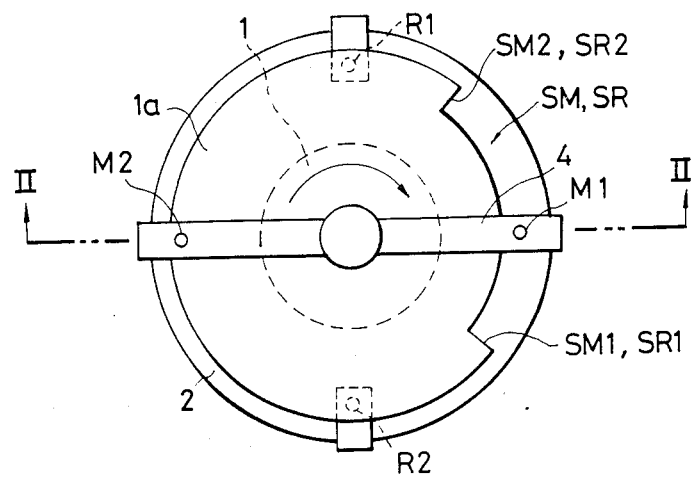
FIG. 1 is a plan view showing a first embodiment of an angle measuring device of the invention.
Figure 2:
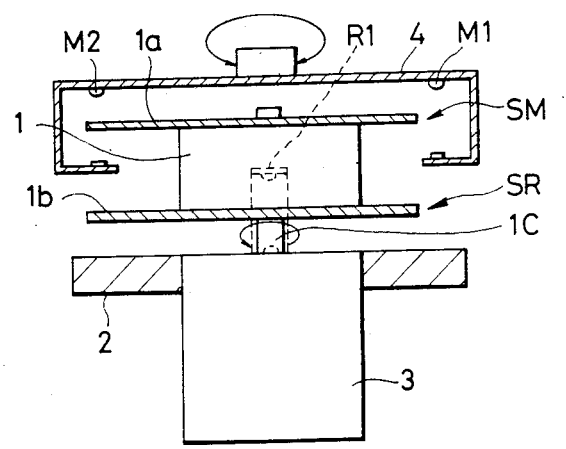
FIG. 2 is a cross-sectional view taken along a line II—II in FIG. 1.

FIG. 1 is a plan view showing a first preferred embodiment of an angle measuring device of the invention, and FIG. 2 is a cross-sectional view taken along a line II—II in FIG. 1.

A rotor 1, as shown in these figures, is composed of two discs 1a and 1b which are turned at a constant speed through a rotary shaft 1c by a motor 3. The rotary shaft 1c is rotatably mounted on a base plate 2 which is a stationary part of the angle measuring device. A collimating arm 4 has a rotary shaft which is substantially coaxial with the rotary shaft 1c. A collimating telescope (not shown) is fixedly secured to the collimating arm 4 in alignment with the collimating arm 4.

Reference section R1 and R2 are provided on the base plate 2. Each reference section has a light-emitting element and a light-detecting element. The disc 1b forming the rotor has a cutout SR having an angular width of about 90° in the periphery thereof. As the rotor 1 rotates, the cutout SR moves across the optical path between the light-emitting element and the light-detecting element of each of the reference points R1 and R2. Accordingly, as the cutout SR passes through the optical paths, the light-detecting elements produce pulses. In FIG. 1, SR1 designates one end of the cutout SR, the front end as viewed in the direction of rotation, and SR2 the other end of the cutout SR, the rear end as viewed in the direction of rotation. The angular width of the cutout SR is not limited to 90°; that is, it may be any angle smaller than 360°.

Angles measuring section M1 and M2 are provided at opposed ends of the collimating arm 4. Similar to the reference sections R1 and R2, each of the angle measuring sections M1 and M2 has a light-emitting element and a light-detecting element which confront one another through the disc 1a. Accordingly, when a cutout SM formed in the disc 1a passes through each of the angle measuring sections M1 and M2, a pulse is produced. The position of the cutout SM is coincident with that of the cutout SR both in the radial and circumferential directions. The cutout SM has an angular width of about 90°. However, as in the case of the cutout SR, the angular width may be any angle smaller than 360°. The cutout SM has one end SM1, the front end as viewed in the direction of rotation, and the other end SM2, the rear end as viewed in the direction of rotation. It is unnecessary to know accurately the values of the angular widths of the cutouts SR and SM.

Figure 3:
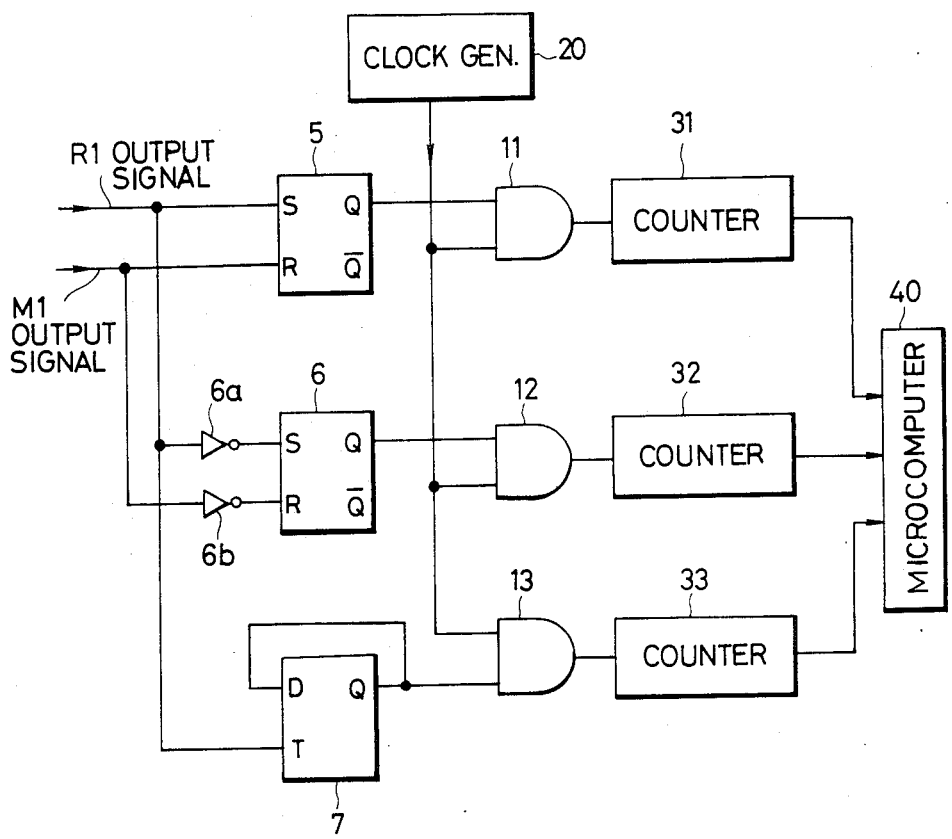
FIG. 3 is a circuit diagram, partly as a block diagram, showing an example of a circuit used in the first embodiment.
Figure 4:
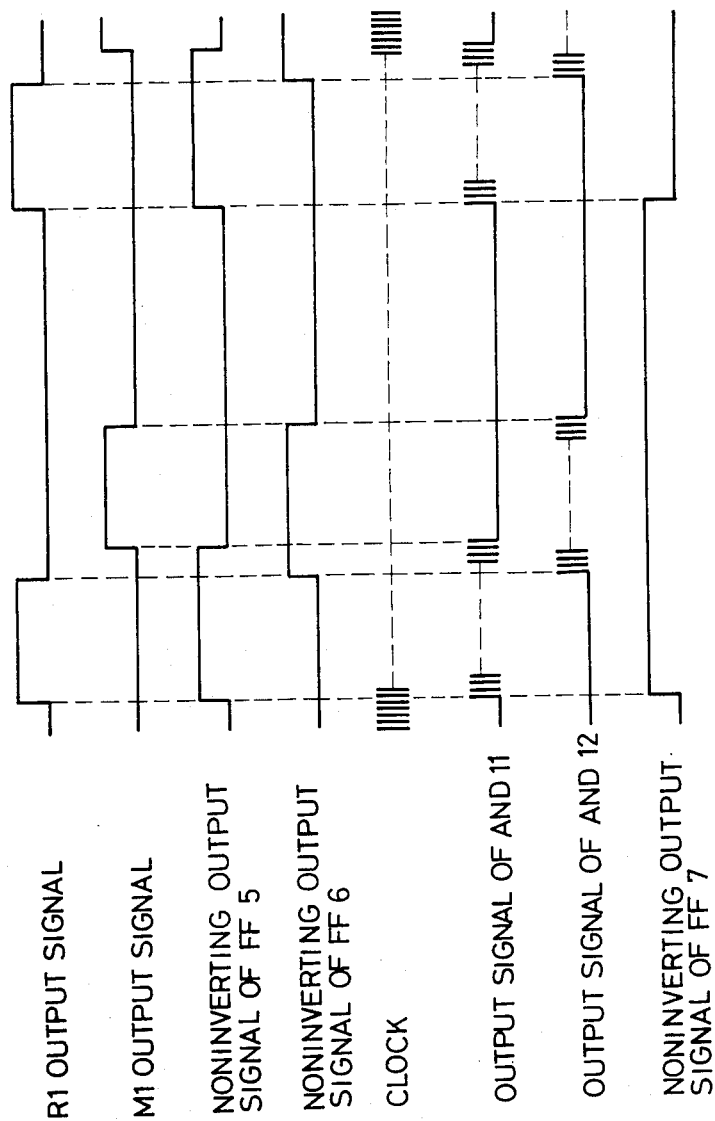
FIG. 4 is a timing chart used for a description of the operation of the first embodiment.

FIG. 3 shows an example of a circuit used in the above-described first embodiment, and FIG. 4 is a timing chart showing the waveforms of signals at essential points in the circuit of FIG. 3.

In order to increase the measurement accuracy, the 180° opposed reading method (in which, for instance, a period of time required for a cutout to move from one reference point to one angle measuring point adjacent thereto, and a period of time required for the cutout to move from the other reference point to the other angle measuring point are measured, and the periods of time thus measured are averaged) should be employed. One such measurement will be described; that is, for each of the discs 1a and 1b, its own cutout is used with the reference section R1 and the angle measuring section M1 only. Of course, in the 180° opposed reading method, it is necessary that measurement be made with respect to the reference section R2 and the angle measuring section M2 as well and the results of measurement averaged.

In FIG. 3, "R1 output signal" designates the output signal of the light-detecting element at the reference section R1, and "M1 output signal" the output signal of the light-detecting element at the angle measuring point M1. Further in FIG. 3, an RS flip-flop 5 is set by the leading edge of the R1 output signal and is reset by the leading edge of the M1 output signal. An RS flip-flop 6, having a set input terminal and a reset input terminal respectively connected to inverters 6a and 6b, is set by the trailing edge of the R1 output signal and is reset by the trailing edge of the M1 output signal.

When a D-type flip-flop 7 receives the R1 output signal, it outputs a pulse continuously for a period of time starting from the time instant that the end SR1 of the cutout SR pass through the reference section R1 until the end SR1 passes through the reference section R1 again, that is, a period of time required for the rotor 1 to make one complete revolution.

A clock pulse generating circuit 20 is provided to generate clock pulses at a predetermined frequency. A counter 31 operates to count clock pulses for a period of time starting the time instant that the end SR1 of the cutout SR passes through the reference section R1 until the end SM1 of the cutout SM passes through the angle measuring section M1. A counter 32 operates to count clock pulses for a period of time for which the RS flip-flop provides its output, namely, for a period of time which elapses from the time instant that the end SR2 of the cutout SR passes through the reference section R until the end SM2 of the cutout SM passes through the angle measuring section M1. A counter 33 operates to detect the number of pulses corresponding to one revolution of the rotor 1.

A microcomputer 40 reads the contents of the counters 31, 32 and 33 to perform the following calculation:

$$360° \times (T_2/T_1),$$

where $T_2$ is the period of time which is obtained by dividing the sum of the contents of the counters 31 and 32 by two and $T_1$ is the output of the counter 33.

In FIG. 3, reference numerals 11, 12 and 13 designate AND gates.

Figure 5:
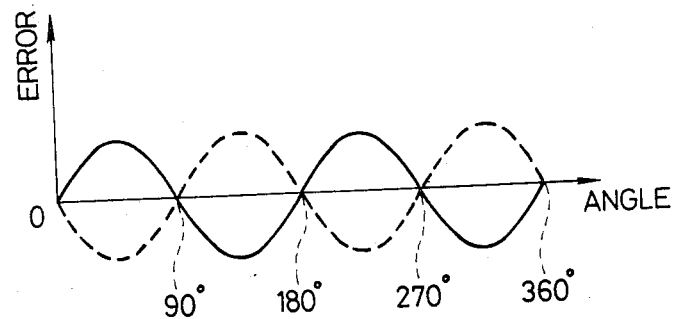
FIG. 5 is a diagram used for a description of the operating principles of the invention.

FIG. 5 illustrates the principle of compensating for a measurement error in the above-described angle measurement. More specifically, FIG. 5 shows error curves which, in the case where the cutout's angular width is 90°, are provided when the included angle of 90° is measured at every position of the transit. The error curve indicated by the solid line is obtained with the conventional method (an error curve for the case when, in FIG. 4, the noninverting output signal of the RS flip-flop 5 and the output signal of the D-type flip-flop 7 are utilized). The error curve indicated by the broken line is obtained when measurement is carried out using the fall of the R1 output signal and the fall of the M1 output signal (an error curve provided for the case where the noninverting output signal of the RS flip-flop 6 and the output signal of the D-type flip-flop 7 are utilized).

More specifically, FIG. 5 shows errors with angles of the collimating arm 4. The solid line curve shows errors occurring with the conventional angle measuring device. The broken line curve is shifted by 90° in phase from the solid line curve. In the first embodiment shown in FIGS. 1 through 4, the angle measurement is carried out with the error curve indicated by the solid line added to the error curve indicated by the broken line. That is, the error in the angle measurement can ideally be zero as the errors indicated by the solid line curve are cancelled by the errors indicated by the broken line curve.

The reason why the broken line curve lags the solid line curve by 90° in FIG. 5, as described before, is that the error to be cancelled occurs as two cycles per revolution of the rotor 1. If the error occurs as four cycles per revolution of the rotor 1, the lag of the broken line curve is 45°. Generally, when the error occurs as n cycles per revolution of the rotor 1, the lag angle of the broken line curve is $360°/(2 \times n)$. Therefore, it is preferable that the angular width of the cutouts SM and SR be $360°/(2 \times n)$.

Figure 6:
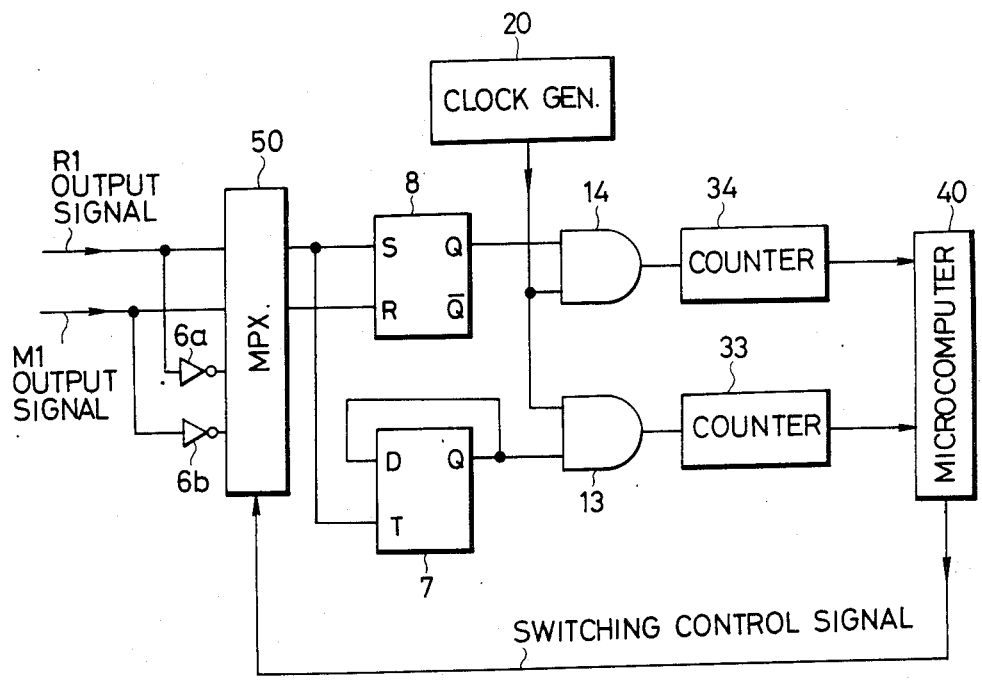
FIG. 6 is a circuit diagram, partly as a block diagram, showing a second embodiment of the invention.

In the embodiment shown in FIG. 3, the counters 31 and 32 are provided to measure the pulse widths of the RS flip-flops 5 and 6 simultaneously (or in a parallel mode). The provision of the two counters contributes to a reduction of the measurement time. However, in the case where it is permitted to take a relatively long measurement time, the two counters 31 and 32 may be replaced by a single counter 34 as shown in FIG. 6. In this case, it is necessary to use a multiplexer 50.

First, the R1 output signal and the M1 output signal operate the RS flip-flop 8, and the counter 34 counts pulses to measure the width thereof with the aid of the AND gate 14. The count value of the counter 34 is stored in a memory. Next, in response to a switching signal from the microcomputer 40, the multiplexer 50 selects the inversion signal of the R1 output signal and the inversion signal of the M1 output signal simultaneously. The counter 34 measures the pulse width using the AND gate 14. The counter value is added to the count value stored in the memory. The result of addition is divided by a value $T_1$ representing one revolution time. The result of division is multiplied by 360° to obtain the value of the measured angle.

Thereafter, in response to a switching signal from the microcomputer 40, the multiplexer 50 selects first signals in combination. The above-described operations are repeatedly carried out. In the above-described case, the pulse counting operations should be performed during the rotation of the rotor 1.

The above-described embodiments may employ a method in which the rotor 1 is rotated a number of times, and the data values $T_1$ and $T_2$ are accumulated to perform the angle measurement.

As is apparent from the above description, in accordance with the invention, the cutout's angular width is larger than that in the conventional angle measuring device, and the data indicative of the rise and fall of the pulses produced in association with rotation of the cutouts is utilized to measure an angle.

In the above-described embodiments, the signals provided for the period of time between the rise and the fall of the pulse are utilized. However, instead of these signals, signals obtained for the period of time between the fall and the rise of the pulse may be utilized for the same effect.

The characteristics of the detecting section such as the light-detecting elements generally change with temperature. Accordingly, since the changes in the rise and fall of the pulse with temperature are opposite to each other, temperature compensation is desirably applied to the detecting sections.

As is apparent from the above description, according to the invention, rotational irregularity occurring as two cycles per revolution of the rotor 1 is sufficiently corrected, and temperature compensation is applied to the detecting sections. Therefore, with the device of the invention, angles can be measured with high accuracy.

We claim:

1. In an angle measuring device in which a period of time $T_1$ required for a part formed in the periphery of a rotor rotated at a constant speed by a motor to make one revolution starting from a stationary reference point, and a period of time $T_2$ required for said part to move between said reference point and an angle measuring point are obtained to evaluate $360° \times (T_2/T_1)$ thereby to obtain an angle under measurement, the improvement wherein said part to be measured is a cutout having an angular width determined according to a rotational irregularity of said motor, means for determining a first elapsed time required for a leading edge of said cutout to move between said reference point and said angle measuring point, means for determining a second elapsed time required for a trailing edge of said cutout to move between said reference point and said angle measuring point, and means for determining said angle under measurement in accordance with said first and second elapsed times.

2. The angle measuring device as claimed in claim 1, wherein said cutout has an angular width between 5° and 355°.

3. The angle measuring device as claimed in claim 1, wherein said cutout has an angular width of about 90°.

4. The angle measuring device as claimed in claim 1, wherein said cutout has an angular width defined by:

$$360°/(2 \times n),$$

where n is the number of cycles of error which occur for every revolution of said rotor.

5. The angle measuring device as claimed in claim 1, wherein said means for determining said periods of time and a value of said angle under measurement comprises a reference section at a fixed position and an angle measuring section on an end of a collimating arm of said angle measuring device, each of said reference section and angle measuring section producing a pulse in response to said part passing thereby, a source of clock pulses, means for gating said clock pulses in response to output signals from said reference section and said angle measuring section, and means for counting the gated clock pulses.

6. The angle measuring device as claimed in claim 1, wherein said rotor comprises two parallel discs rigidly coupled together to rotate at the same speed, each of said discs having one said cutout.

* * * * *